US006879137B2

(12) United States Patent
Sase et al.

(10) Patent No.: US 6,879,137 B2
(45) Date of Patent: Apr. 12, 2005

(54) POWER-SUPPLY DEVICE

(75) Inventors: Takashi Sase, Hitachi (JP); Koji Tateno, Hitachi (JP); Akihiko Kanouda, Hitachinaka (JP); Katsunori Hayashi, Odawara (JP); Shinichi Yoshida, Takasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/937,397

(22) Filed: Sep. 10, 2004

(65) Prior Publication Data

US 2005/0029997 A1 Feb. 10, 2005

Related U.S. Application Data

(63) Continuation of application No. 10/462,680, filed on Jun. 17, 2003, now Pat. No. 6,798,180.

(30) Foreign Application Priority Data

Jun. 17, 2002 (JP) ........................................ 2002-175172

(51) Int. Cl.[7] .............................................. G05F 1/575
(52) U.S. Cl. ..................................................... 323/282
(58) Field of Search ................................ 323/282, 284, 323/351

(56) References Cited

U.S. PATENT DOCUMENTS

| 5,465,201 A | 11/1995 | Cohen |
| 5,877,611 A | 3/1999 | Brkovic |
| 5,982,160 A | 11/1999 | Walters et al. |
| 6,127,814 A | 10/2000 | Goder |
| 6,147,478 A | 11/2000 | Skelton et al. |
| 6,163,142 A | 12/2000 | Tsujimoto |
| 6,229,289 B1 | 5/2001 | Piovaccari et al. |
| 6,356,063 B1 | 3/2002 | Brooks |
| 6,798,180 B2 * | 9/2004 | Sase et al. .................. 323/282 |

FOREIGN PATENT DOCUMENTS

JP            2000-193687            7/2000

OTHER PUBLICATIONS

MAXIM "Low–Voltage, 400 mA Step–Down DC–DC Converters in SOT 23", pp 1–9.
Michael T. Zhang, et al., Design Considerations for Low–Voltage On–Board DC/DC Modules for Next Generation of Data Processing Circuits, IEEE Transactions on Power Electronics, vol. 11, No. 2, Mar. 1996.

* cited by examiner

Primary Examiner—Adolf Berhane
(74) Attorney, Agent, or Firm—Mattingly, Stanger, Malur & Brundidge, P.C.

(57) ABSTRACT

A step down type DC-DC power-supply device implements both the stabilization of the control loop and the responsibility at the same time. In the power-supply device, an output power signal is fed back to an error amplifier after having passed through a CR smoothing filter provided independently of a power LC smoothing filter. Also, independently of the duty controls over Power MOSFETs, i.e., upper-side/lower-side semiconductor switching components in the steady state, an output from the power LC smoothing filter is added to an upper and lower limit-mode-equipped control circuit, thereby, at the transient state, forcefully setting the duty α at either 0% or 100%.

16 Claims, 14 Drawing Sheets

OPERATION STATE MODE

| VOLTAGE LEVEL | | THEORETICAL VALUE AT POINT A | THEORETICAL VALUE AT POINT B | STATE DRIVING OF SWITCHES | DUTY α |
|---|---|---|---|---|---|
| Vout | +Δ ↑ Vref ↓ -Δ | L | L | SW1, 4 : on<br>SW2, 3 : off | 0% |
| | | L | H | SW1~4 : all off | DESIRED α |
| | | H | H | SW1, 4 : off<br>SW2, 3 : on | 100% |

OPERATION STATE MODE

| VOLTAGE LEVEL | | THEORETICAL VALUE AT POINT A | THEORETICAL VALUE AT POINT B | STATE DRIVING OF SWITCHES | DUTY $\alpha$ |
|---|---|---|---|---|---|
| Vout | +Δ ↑ | L | L | RST | 0% |
| | Vref | L | H | CLK TRIGGER-PULSE OPERATION | DESIRED $\alpha$ |
| | ↓ −Δ | H | H | SHORT-CIRCUIT OF CT | 100% |

FIG.22

OPERATION STATE MODE

| VOLTAGE LEVEL | THEORETICAL VALUE AT POINT A | THEORETICAL VALUE AT POINT B | STATE DRIVING OF SWITCHES | DUTY $\alpha$ |
|---|---|---|---|---|
| Vout +Δ ← Vref → +Δ | L | L | C0 | 0% |
| | L | H | C1 | DESIRED $\alpha$ |
| | H | H | C3 | 100% |

POWER-SUPPLY DEVICE

CROSS-REFERENCE TO RELATED APPLICATIONS

This is a Continuation of application Ser. No. 10/462,680, filed Jun. 17, 2003, now U.S. Pat. No. 6,798,180 the entire disclosure of which is hereby incorporated by reference.

BACKGROUND OF THE INVENTION

1. Field of the Invention

The present invention relates to a power-supply device where, independently of a power L/C smoothing filter, a signal is caused to pass through a CR smoothing filter and is then fed back so that the control loop will be stabilized.

2. Description of the Related Art

A prior art on the loop stabilizing method for a power-supply device has bene described in "Low-Voltage On-Board DC/DC Modules for Next Generations of Data Processing Circuits", Zhang et al., IEEE Tran. on Power Elect. Vol. 11, No. 2, March 1996. In the power-supply device according to the prior art, a signal is fed back to an error amplifier from a power LC smoothing filter. Then, the error amplifier compensates the phase, thereby implementing the stabilization of the control loop. In this prior art, an aluminum electrolytic capacitor is used as the power LC smoothing filter.

U.S. Pat. No. 5,877,611 discloses a power supply system in which an output of a CR smoothing filter connected across an inductor of an output LC smoothing filter is fed back to an error amplifier having a low input impedance. In the U.S. patent prior art, voltage and current signals of a power supply output are extracted using the CR smoothing filter, so that the resistance value of the CR smoothing filter must be set to be small. The component constants of the CR smoothing filter are a capacitance of 0.47 $\mu$F and a resistance of 100 $\Omega$. Accordingly, the Cr smoothing filter having such constants cannot be formed on chip in a power supply IC and must be formed externally of the IC chip, resulting in a problem that the power supply device cannot be made in small size totally.

SUMMARY OF THE INVENTION

In order to downsize the power-supply device, instead of using the aluminum electrolytic capacitor as the power LC smoothing filter, there has occurred a necessity for using a ceramic capacitor of a chip-part as the power LC smoothing filter. However, the equivalent series resistance (ESR) of the chip ceramic capacitor is equal to several m$\Omega$, which is considerably small. What is more, the ceramic capacitors are connected in parallel under an actual use condition. Accordingly, the total of the ESRs in this case becomes less than 1 m$\Omega$, which is even smaller. This makes it impossible to expect the damping of the ESR as is expected in the case of using the aluminum electrolytic capacitor. Consequently, it becomes difficult to stabilize the control loop.

In the above-described prior art, when using the ceramic capacitor with the small ESR as the power LC smoothing filter, it becomes impossible to expect the damping effect of the ESR. This causes a signal to oscillate, thereby making the phase compensation difficult. Also, if, in the prior art, it were to become possible to implement the phase compensation by narrowing the operation bandwidth of the error amplifier, a response from the power-supply is delayed exceedingly. Moreover, in modifying the LC smoothing filter's constants, there exists a troublesome task of adjusting the phase compensation condition of the error amplifier on each that occasion.

It is an object of the present invention to provide a power-supply device that employs a novel control method where, independently of a power LC smoothing filter, a signal is caused to pass through a CR smoothing filter and is then fed back so that the control loop will be stabilized.

A power-supply device according to one aspect of the present invention is as follows: In the control loop of the power-supply device of a step-down type DC-DC converter, a CR smoothing filter is provided independently of a power LC smoothing filter. Moreover, a signal corresponding to the output power is fed back to an error amplifier after having passed through the CR smoothing filter.

Also, a power-supply device according to another aspect of the present invention includes the following unit: Independently of the duty controls over Power MOSFETs, i.e., upper-side/lower-side semiconductor switching components in the steady state, the unit adds the output from a power LC smoothing filter to an upper and lower limit value detecting circuit, thereby, at the transient state, forcefully setting the duty at either 0% or 10%.

Moreover, a power-supply device according to still another aspect of the present invention is as follows: The power-supply device includes power-supply device units prepared in plural number. In order to perform a parallel operation of these power-supply device units, the power-supply device further includes an oscillator and a phase shift circuit that the plural power-supply device units have in common. Furthermore, in the steady state, phases of driving pulses of upper-side/lower-side Power MOSFETs in the respective power-supply device units are respectively shifted to phases that result from dividing 360° by the number of the parallelism. At the transient state, all of the parallel power-supply device units are operated by driving phases of one and the same phase.

Other objects, features and advantages of the invention will become apparent from the following description of the embodiments of the invention taken in conjunction with the accompanying drawings.

BRIEF DESCRIPTION OF THE DRAWINGS

FIG. 22 is a diagram for illustrating the operation state mode in FIG. 21.

DETAILED DESCRIPTION OF THE EMBODIMENTS

Referring to the accompanying drawings, the explanation will be given below concerning the details of the present invention.

Embodiment 1

Figure 1:
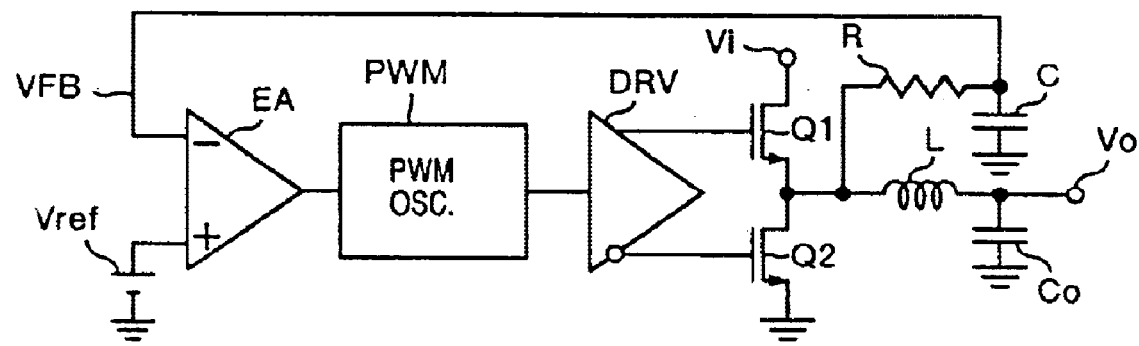
FIG. 1 is a circuit block diagram for illustrating a power-source device of a first embodiment in the present invention.

FIG. 1 illustrates a power-supply device of the present embodiment. In FIG. 1, reference notations Vi and Vo denote an input terminal and an output terminal, respectively. An upper-side Power MOSFET Q1 is connected to the input terminal Vi, and a lower-side Power MOSFET Q2 is connected to a ground potential side. An LC smoothing filter, i.e., a power output filter consisting of an inductor L and a capacitor Co, and a CR smoothing filter consisting of a resistor R and a capacitor C are connected in parallel to a midpoint of the Power MOSFETs Q1 and Q2. Moreover, the output terminal Vo is connected to a midpoint of the LC smoothing filter, and one input (−) of an error amplifier EA is connected to a midpoint of the CR smoothing filter. Here, the capacitor Co of the LC smoothing filter is a chip ceramic capacitor.

Also, a reference voltage Vref is connected to the other input (+) of the error amplifier EA. A pulse-width modulation (abbreviated as PWM) oscillator PWM, and gates of the Power MOSFETs Q1 and Q2 via a driver DRV are connected to an output of the error amplifier EA. The Power MOSFETs Q1 and Q2 are driven in opposite phases to each other, and thus are electrically conducted alternately. In the present embodiment, an output voltage Vout is smaller than an input voltage Vin.

Next, the explanation will be given below regarding the circuit operation in FIG. 1. The input voltage Vin applied to the input terminal Vi is converted into a voltage by on/off controls over the upper-side Power MOSFET Q1 and the lower-side Power MOSFET Q2 via the CR smoothing filter. This converted voltage VFB is compared with the reference voltage Vref by the error amplifier EA. As a consequence, an error voltage is generated in a state of being amplified at the output of the error amplifier EA. This error voltage is converted into a PWM pulse by the pulse-width modulation oscillator PWM. This PWM pulse is further converted by the driver DRV into an on/off-time ratio (i.e., duty: $\alpha$) at which the driver DRV drives the upper-side Power MOSFET Q1 and the lower-side Power MOSFET Q2. Moreover, a negative-feedback control is performed over the PWM pulse so that the error voltage becomes equal to 0. As a result of this, the converted voltage VFB becomes equal to the reference voltage Vref. In this case, the converted voltage VFB acquired through the CR smoothing filter in the steady state is proportional to the duty $\alpha$ of the input voltage Vin. Consequently, the following relational expression holds:

$$VFB = Vref = \alpha \cdot Vin$$

where the duty $\alpha$ assumes a value in the range of 0 to 1, since $\alpha$ is defined as the on-time/(a total of the on-time and the off-time).

In the case of the ordinary step-down type converter, it has been found out that the voltage-converted ratio in the steady state is equal to the ratio, i.e., the duty, between the output voltage and the input voltage. Accordingly, assuming that the input voltage is Vin and the duty is $\alpha$, the output from the LC smoothing filter, i.e., the output voltage Vout acquired at the output terminal Vo, can be determined by a relational expression:

$$Vout = \alpha \cdot Vin.$$

From the above-described 2 expressions, the following relational expression holds:

$$Vout = VFB = \alpha \cdot Vin.$$

Consequently, even if no direct negative-feedback control is performed over the output from the LC smoothing filter, if an indirect control over the duty $\alpha$ using some other method proves successful, this successful indirect control becomes equivalent to a direct control over the output voltage Vout at the output terminal Vo. As a result, it becomes possible to acquire, at the output terminal Vo, the voltage that is proportional to the duty $\alpha$ of the input voltage Vin. In other words, the Power MOSFETs Q1 and Q2 are driven, thereby performing the negative-feedback control over the output from the CR smoothing filter. This operation allows the desired voltage, which is proportional to the duty $\alpha$ of the input voltage Vin, to be also acquired at the output from the LC smoothing filter as the output voltage Vout.

As the voltage converting method based on the duty control over the upper-side Power MOSFET Q1 and the lower-side Power MOSFET Q2, the present embodiment is a primary-delay control method where the CR smoothing filter is used for the control loop. Accordingly, since there exists none of the secondary delay by the LC smoothing filter as was found in the prior art, the control loop does not become the oscillating system. This prevents the oscillating waveform from occurring in the output, thereby making the loop stable. Consequently, according to the present embodiment, even if the chip ceramic capacitor with a small ESR is used as the capacitor of the LC smoothing filter, it is possible to stabilize the control loop.

Next, the explanation will be given below concerning the large-or-small relationship among the corner frequencies and the switching frequency of the above-described 2 smoothing filters. Let's assume that the corner frequency of the CR smoothing filter and that of the LC smoothing filter are equal to fCR and fLC respectively, and that the switching frequency is equal to fSW. Then, setting the relationship among these frequencies as fLC<fCR<fSW makes it possible to ensure the stability of the loop. Moreover, from this relationship, the feedback from the CR smoothing filter results in a higher operation frequency as compared with the feedback from the LC smoothing filter, which allows the implementation of the high-speed response. Also, fLC and fCR are set as frequencies that are different to some extent. This setting, even if the LC smoothing filter's constants are modified, makes it unnecessary to change the CR smoothing filter's constants, thereby allowing an increase in the degree-of-freedom of the design. With respect to the high-speed operation of a 1-to-6 MHz switching frequency, values usable as the LC smoothing filter's constants and the CR smoothing filter's constants are, e.g., 0.2 $\mu$H, 220 $\mu$F, and 20 pF, 200 k$\Omega$, respectively. If the values of these capacitors and this resistor are of these orders, it becomes possible to mount (i.e., on-chip) the CR smoothing filter on a semiconductor integrated circuit chip, thereby making externally-attached components unnecessary. This means the following: By merely replacing the power-supply device illustrated in FIG. 1 by an IC whose terminal location is the same (i.e., pin-compatible) as that of the power-supply control IC in the prior art, the printed wiring board in the prior art can be utilized with no modification added thereto.

Figure 2:
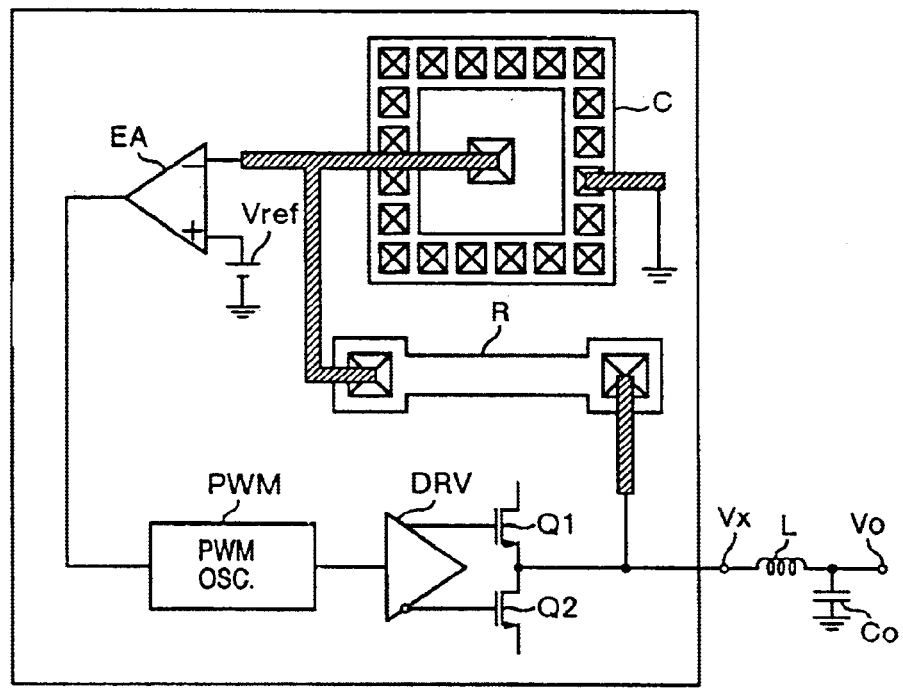
FIG. 2 is an exemplary diagram for explaining an IC where a CR filter is built in a semiconductor chip in the power-supply device in FIG. 1.

FIG. 2 is an explanatory diagram for explaining the chip layout in the case where, in the power-supply device in FIG. 1, the CR smoothing filter is built in a semiconductor chip. In FIG. 2, reference notations C and R denote a built-in capacitor and a built-in resistor, respectively. These components are mounted on a semiconductor board that is the same as the one that mounts thereon the error amplifier EA, the pulse-width modulation oscillator PWM, the driver DRV, and the Power MOSFETs Q1 and Q2.

So far, the explanation has been given selecting, as the example, the CR smoothing filter whose output is fed back to the error amplifier in the control loop. Instead of the CR smoothing filter, however, the use of another high-response filter circuit allows the acquisition of basically the same effects. Also, although the explanation has been given selecting the Power MOSFETs as the example of the semiconductor switching components, the IGBTs may be used instead.

Embodiment 2

Figure 3:
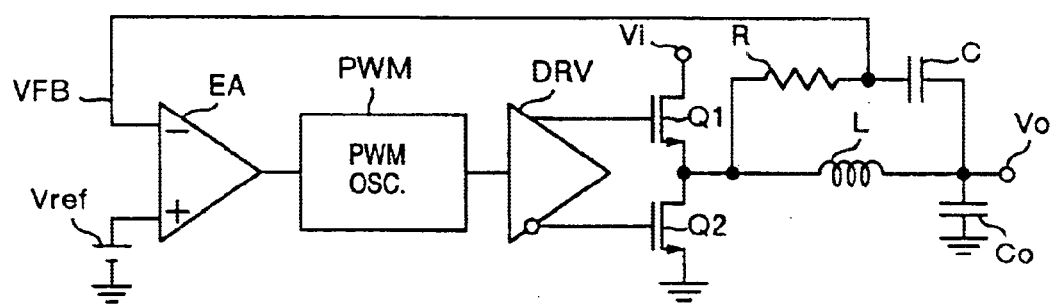
FIG. 3 is a circuit block diagram for illustrating a power-supply device of a second embodiment of the present invention.
Figure 4:
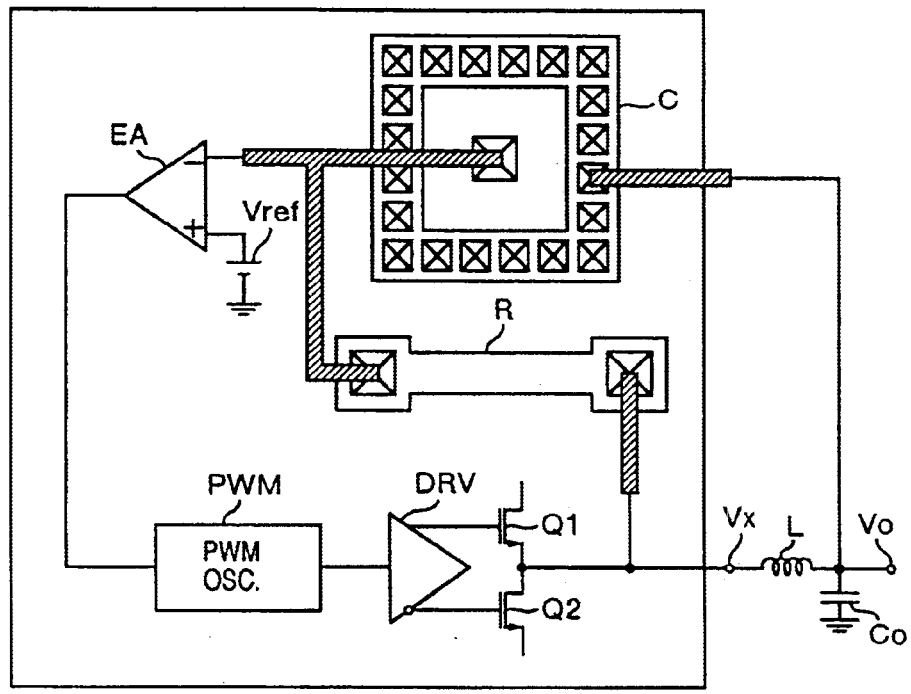
FIG. 4 is an explanatory diagram for explaining an IC where a CR filter is built in a semiconductor chip in the power-supply device in FIG. 3.

FIG. 3 illustrates the present embodiment. In FIG. 3, the same reference notations are attached to the same configuration components in FIG. 1. The point in which FIG. 3 differs from FIG. 1 is that the CR smoothing filter is set up at both ends of the inductor L of the LC smoothing filter. In the present embodiment, since the electrostatic capacitance of the capacitor Co of the output LC smoothing filter is large, the inductor-connected edge side of the capacitor Co can also be regarded as the ground potential. The present embodiment also allows the acquisition of basically the same effects in FIG. 1. Furthermore, the present embodiment makes it possible to perform the negative feedback of an infinitesimal capacitance change caused by a temperature change in the capacitor Co of the LC smoothing filter. Consequently, even if the chip ceramic capacitor with a small ESR is used, the present embodiment permits an enhancement in the stability of the control loop. In this case as well, the constants of the embodiment in FIG. 1 are usable as the CR smoothing filter's constants. FIG. 4 illustrates an explanatory diagram for explaining the chip layout in the case where, in the power-supply device in FIG. 3, the CR smoothing filter is built in a semiconductor chip.

Embodiment 3

Figure 5:
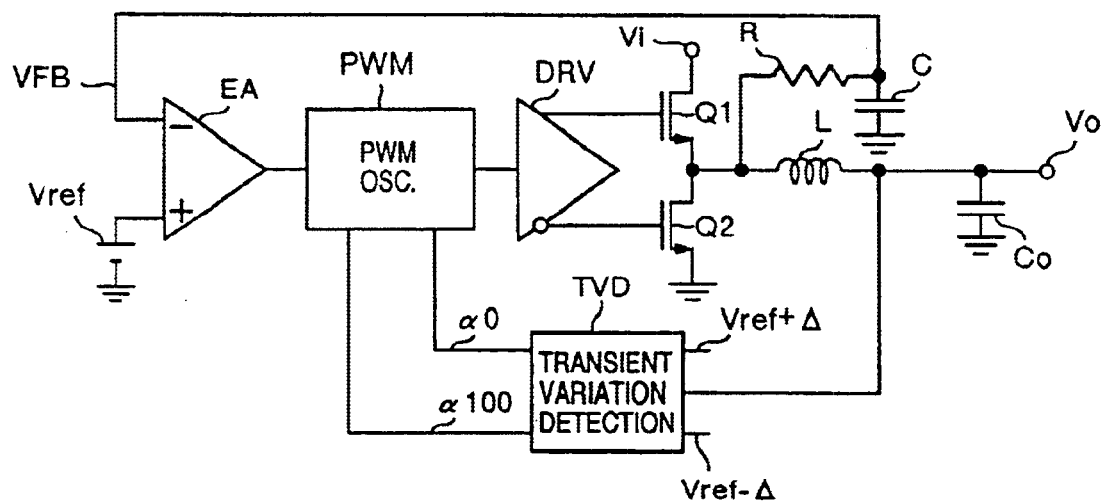
FIG. 5 is a circuit block diagram for illustrating a power-supply device of a third embodiment in the present invention.
Figure 6:
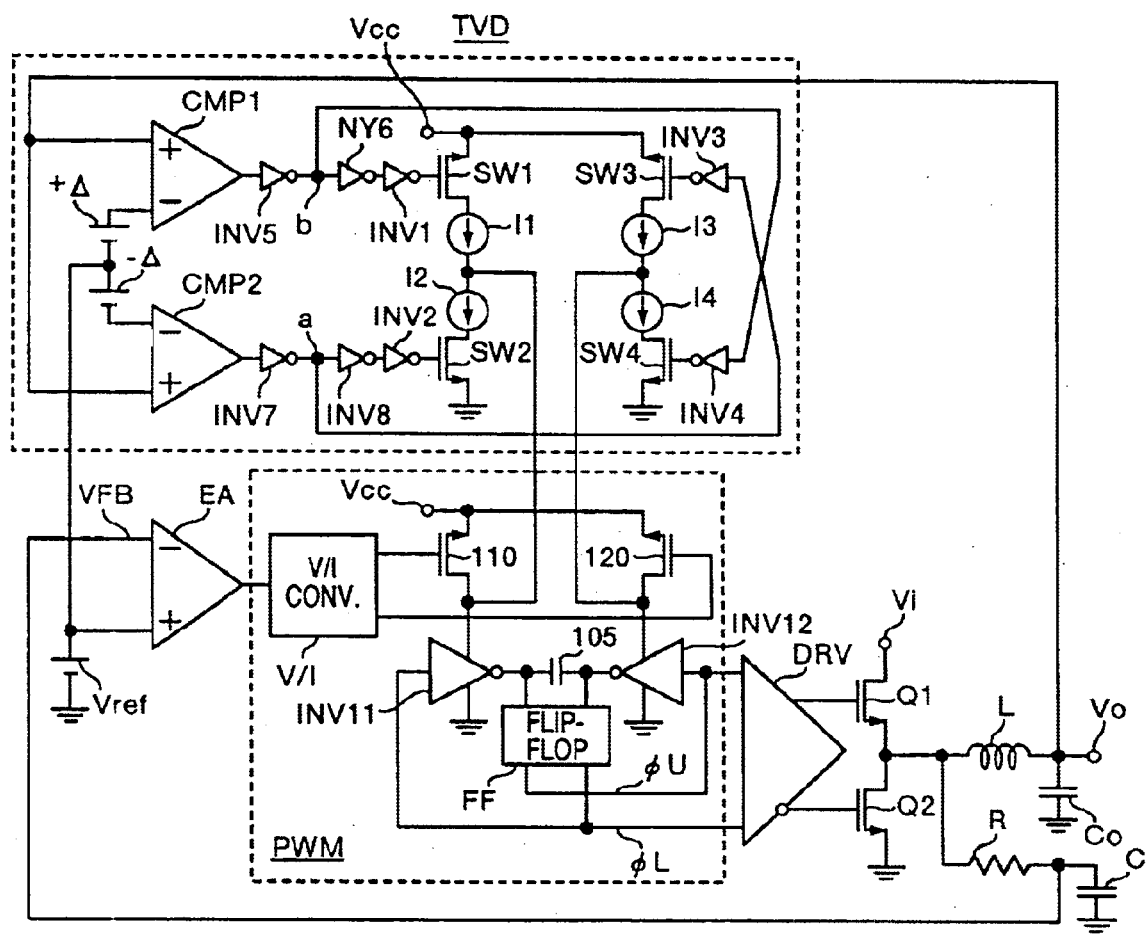
FIG. 6 is a circuit diagram for illustrating the details in FIG. 5.

FIG. 5 illustrates a power-supply device obtained by further providing a transient variation detecting circuit TVD into the 1st embodiment. This transient variation detecting circuit TVD controls the duty of the pulse-width modulation oscillator PWM by detecting a transient load variation between the output voltage Vout at the output terminal Vo and a voltage that results from adding a upper and lower limit-voltage with ±$\Delta$ to the reference voltage Vref. FIG. 6 illustrates a concrete example of the pulse-width modulation oscillator PWM and that of the transient variation detecting circuit TVD.

In FIG. 6, the pulse-width modulation oscillator PWM is a variable oscillator including a voltage-to-current converting circuit V/I, current-source MOSs 110, 120, inverters INV11, INV12, a capacitor 105, and a flip-flop FF. Also, the transient variation detecting circuit TVD includes comparators CMP1, CMP2, switching MOSs SW1 to SW4, constant current-sources I1 to I4, and inverters INV1 to INV8.

The transient variation detecting circuit TVD includes a wind comparator consisting of the 2 comparators CMP1, CMP2. The circuit TVD compares the output voltage Vout with the voltage that results from adding to the upper and lower limit-voltage width ±$\Delta$ to the reference voltage Vref, thereby detecting the operation state of the output voltage Vout and determining the pulse duty $\alpha$ of the oscillator PWM indicated in FIG. 7. This means that, in the transient variation detecting circuit TVD, the control method in the steady state and the one at the transient state are switched into control modes that match the operation state.

From the outputs from the 2 comparators CMP1, CMP2, the following 3-way information is acquired: (a) a case where the load current is decreased, (b) the steady state, (c) a case where the load current is increased. Using FIG. 7, these cases will be explained below:

The case (a) is under a condition Vout$\geq$(Vref+$\Delta$). At this time, the output duty $\alpha$ of the pulse-width modulation oscillator PWM is forcefully set at 0%. For this purpose, the switching MOSs SW1 and SW4 are turned on, and the switching MOSs SW3 and SW2 are turned off. As a result, a current from the constant current-source I1 is added to a current from the current-source MOS 110, then flowing together to the inverter INV11. A current from the constant current-source I4 is subtracted by a current to the current-source MOS 120, so that the current value flowing to the inverter INV12 becomes equal to 0. Consequently, the upper-side Power MOSFET Q1 is switched off, and the lower-side Power MOSFET Q2 is switched on, which, eventually, makes the duty $\alpha$ equal to 0%. In this case, in order to set the duty $\alpha$ at 0% completely, it is preferable that current values from the constant current-sources I1 to I4 be each set at the total current of differential pair operation currents of the voltage-to-current converting circuit V/I.

The case (b) is under a condition (Vref+$\Delta$)>Vout>(Vref-$\Delta$). In this case, all of the switching MOSs SW1 to SW4 are turned off, and are operated in accordance with a current ratio determined by a control instruction from the error amplifier EA. Since this current ratio is equal to the rate of the duty, the voltage that is proportional to the duty $\alpha$ of the input voltage Vin can be acquired as the output voltage Vout.

The case (c) is under a condition Vout$\leq$(Vref-$\Delta$), where the duty $\alpha$ is forcefully set at 100%. In this case, the switching MOSs SW3 and SW2 are turned on, and the switching MOSs SW1 and SW4 are turned off. As a result, a current from the constant current-source I3 is added to the current from the current-source MOS 120, then flowing together to the inverter INV12. A current from the constant current-source I2 is subtracted by the current to the current-source MOS 110, so that the current value flowing to the inverter INV11 becomes equal to 0. Consequently, the upper-side Power MOSFET Q1 is switched on, and the lower-side Power MOSFET Q2 is switched off, which, eventually, makes the duty α equal to 100%. In this case, in order to set the duty α at 100% completely, it is preferable that the current values from the constant current-sources I1 to I4 be each set at the total current of the differential pair operation currents of the voltage-to-current converting circuit V/I.

The present embodiment forcefully switches the duty α of the pulse-width modulation oscillator PWM to either 0% or 100% so that the voltage generated at the output terminal Vo at the transient state will fall within the upper and lower limit-voltage width ±Δ added to the reference voltage Vref. This rapidly suppresses, the output voltage Vout within (Vref ±Δ). Moreover, when the operation state enters the steady state, the present embodiment causes the output voltage to be stabilized as the voltage that is proportional to the duty α of the input voltage.

In this way, in the present embodiment, the control mode is automatically switched depending on whether the operation state is the transient state or the steady state. As a consequence, with respect to even, e.g., an about 10A transient load variation having the high current slew rate (i.e., di/dt) of 500 a/μs, it becomes possible to simultaneously implement both the high-speed response and the stabilization of the output voltage in the steady state.

Figure 20:
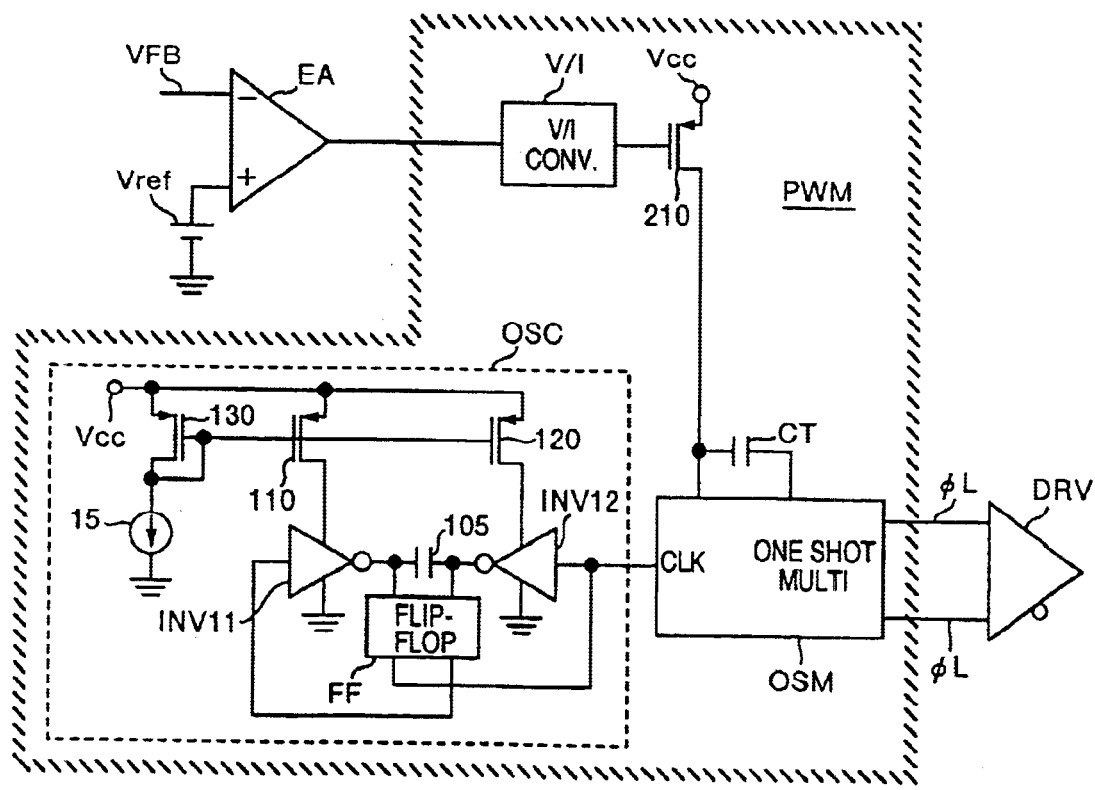
FIG. 20 is an explanatory diagram for illustrating another embodiment of a pulse-width modulation oscillator PWM.

Next, using FIG. 20, the description will be given below concerning another embodiment of the pulse-width modulation oscillator PWM. A circuit illustrated in FIG. 20 can be implemented by a combination of an oscillator OCS, a one-shot multivibrator OSM, and a V/I converter V/I. A constant time-period pulse can be generated by the oscillator OSC as follows: A MOS 130 and a constant current-source I5 set a constant current which is needed for determining the desired time-period. Next, this constant current is made to flow to the current-source MOSs 110, 120 of the pulse-width modulation oscillator PWM in FIG. 6. Also, when this constant time-period pulse is applied to a clock terminal CLK of the one-shot multivibrator OSM, the terminal voltage of a capacitor CT becomes equal to 0, on a temporary basis. At the next moment, however, the capacitor CT is electrically charged by a current that results from converting the error voltage of the error amplifier EA by the V/I converter V/I. Moreover, a time that has elapsed until this charge voltage attains to a predetermined threshold value is acquired as the PWM pulse. In this way, the series of pulse-width modulation oscillating operations can be repeated. Namely, it becomes possible to acquire the PWM pulse that is proportional to the error voltage of the error amplifier EA.

This pulse-width modulation oscillator PWM is used as an effective unit in a multi-phase control in FIG. 11 and FIG. 12 which will be described later. In this case, in order to implement the multi-phase operation, a phase shift circuit needs to be inserted after the oscillator OSC.

Embodiment 4

Figures 7, 8:
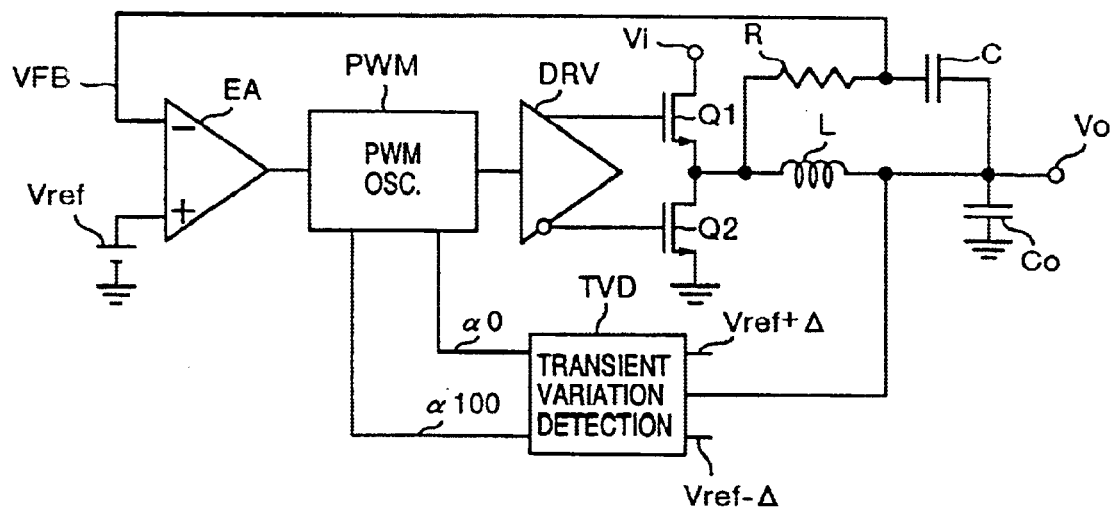
FIG. 7 is a diagram for illustrating the operation state mode in FIG. 6.
FIG. 8 is a circuit block diagram for illustrating a power-supply device of a fourth embodiment in the present invention.
Figure 9:
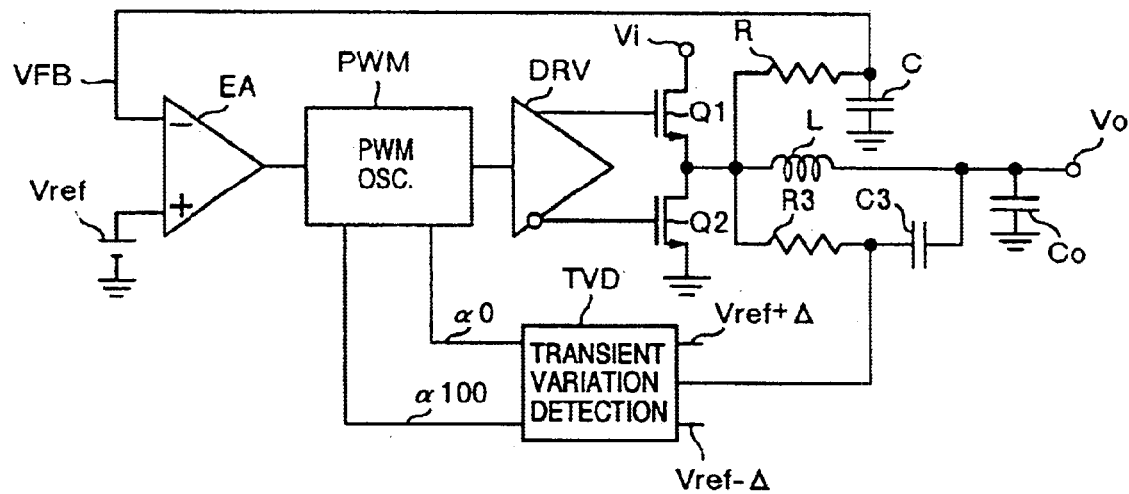
FIG. 9 is a circuit block diagram for illustrating another power-supply device of the fourth embodiment.
Figure 10:
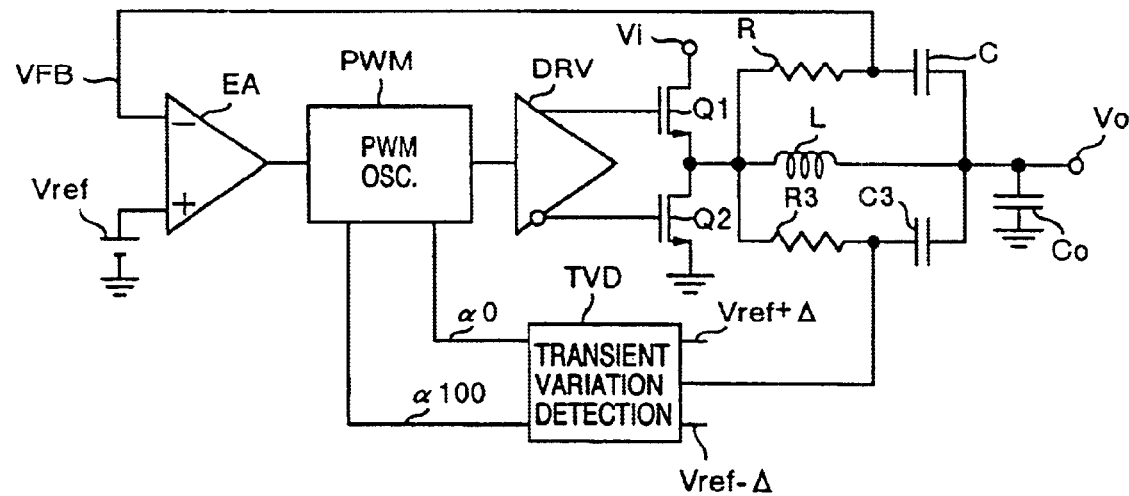
FIG. 10 is a circuit block diagram for illustrating still another power-supply device of the fourth embodiment.

FIGS. 8 to 10 illustrate the present embodiment. The embodiment in FIG. 8, which is obtained by providing the transient variation detecting circuit TVD into the embodiment in FIG. 3, allows the acquisition of basically the same effects in FIG. 5. The configurations in FIG. 9 and FIG. 10 are as follows: In the circuit diagrams in FIG. 1 and FIG. 3, the input into the transient variation detecting circuit TVD is drawn from the midpoint of a series circuit that consists of a capacitor C3 and a resistor R3 which are set up at both ends of the inductor L of the LC smoothing filter. As a result of this, the phase of an inductor L current, which can be detected by the series circuit of the capacitor C3 and the resistor R3, and the charge/discharge phase of the output capacitor Co can be made to coincide with each other. Consequently, it becomes possible to eliminate as much as possible excessive/redundant electric charges produced by the charge/discharge of the output capacitor Co from the inductor L current. This makes it possible not only to implement the high-speed response and the high stability, but also to reduce a variation (i.e., ripple) in the output voltage at the transient state.

Embodiment 5

The present embodiment is a multi-phase embodiment where the plural power-supply device units in the 1st to the 4th embodiments are operated in parallel. The present embodiment combines the 2 or more same-type power-supply devices indicated in the 1st to the 4th embodiments. Hereinafter, the explanation will be given below selecting the 2-phasing as the example.

Figure 11:
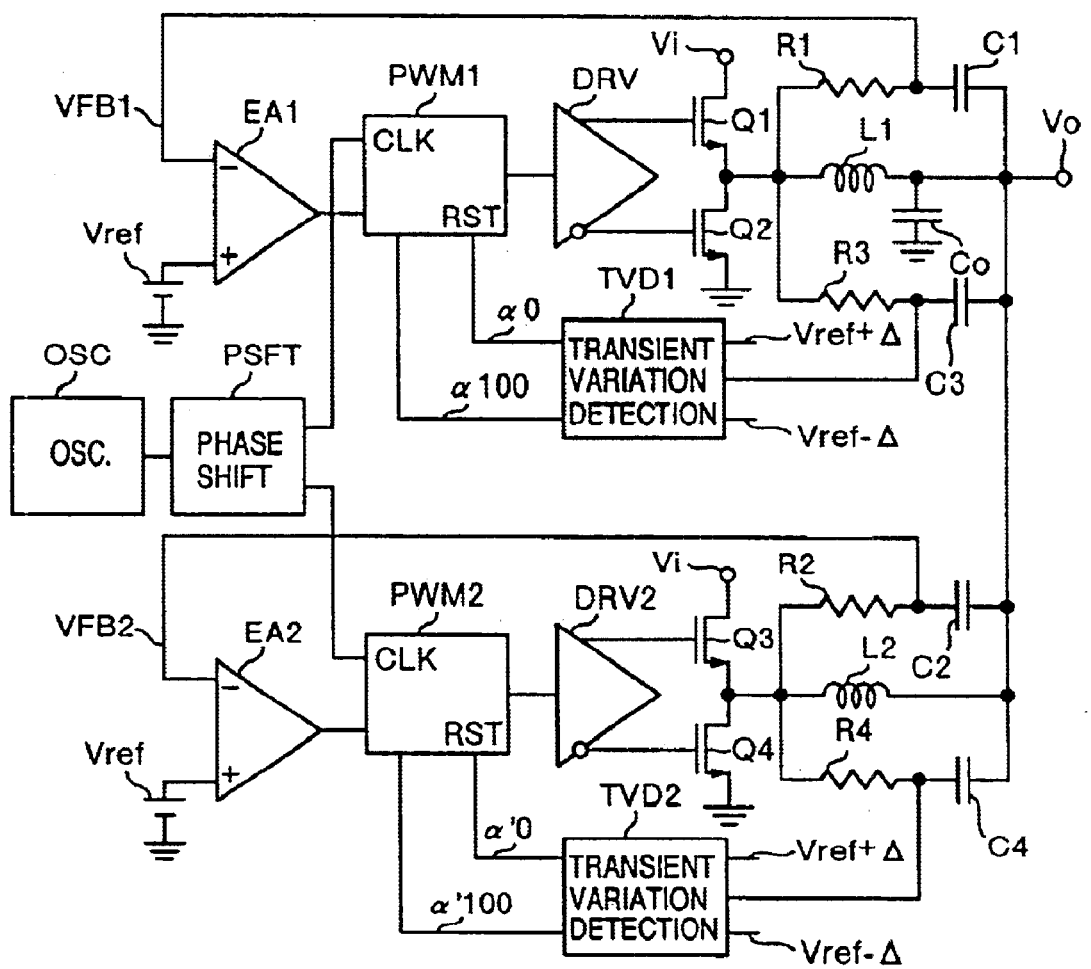
FIG. 11 is a circuit block diagram for illustrating a multi-phase power-source device of a fifth embodiment in the present invention.

FIG. 11 illustrates the embodiment that results from multi-phasing the power-supply device unit in FIG. 8. In order to implement the multi-phasing, the embodiment in FIG. 11 newly includes the oscillator OSC and a phase shift circuit PSFT, which generates 2-phase pulses whose phases are shifted to each other by 180°. This embodiment inputs each of the 2-phase pulses into each of pulse-width modulation oscillators PWM1 and PWM2, thereby implementing the multi-phase control.

Figure 12:
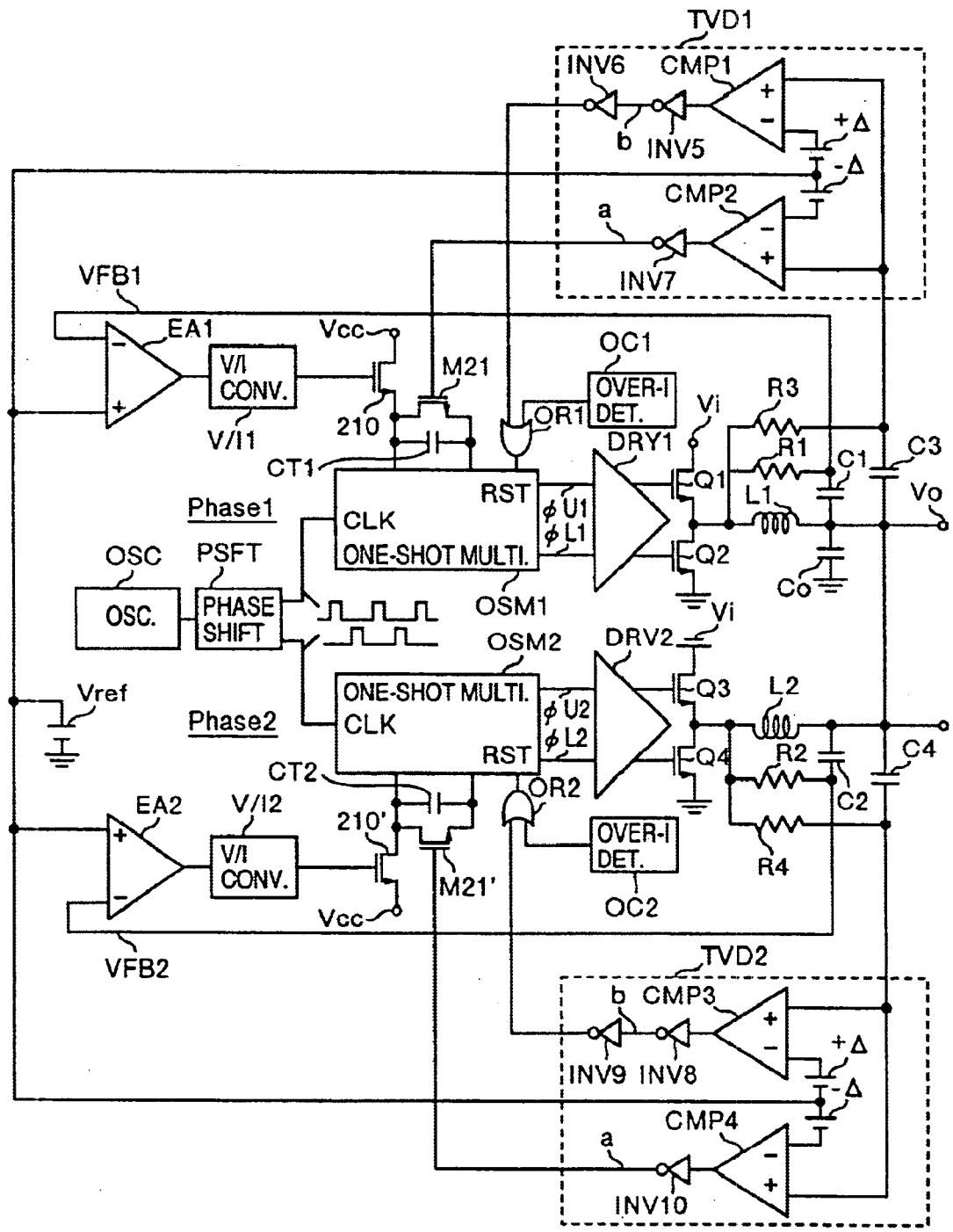
FIG. 12 is a circuit diagram for illustrating the details in FIG. 11.

FIG. 12 illustrates, in more detail, the embodiment of the power-supply device in FIG. 11. In FIG. 12, the pulse-width modulation oscillator PWM1 includes a voltage-to-current converting circuit V/I1 and a one-shot multivibrator OSM1. In the steady state, the oscillator PWM1 operates by receiving a pulse signal from the phase shift circuit PSFT.

Using an operation state mode in FIG. 13, the explanation will be given below regarding the operation of the embodiment in FIG. 12. This operation state mode will be explained in much the same way as the case of the 3rd embodiment. Hereinafter, the explanation will be given concerning the Phase 1 power-supply illustrated on the upper-half side in FIG. 12.

(a) In the case of Vout≧(Vref+Δ), the output duty of the pulse-width modulation oscillator PWM1 is forcefully set at 0%. For this purpose, the reset RST of the one-shot multivibrator OSM1 is turned on, which makes the duty equal to 0%.

(b) In the case of (Vref+Δ)>Vout>(Vref−Δ), as an ordinary operation of the one-shot multivibrator, the OSM1 receives the pulse from the phase shift circuit PSFT as a clock CLK, thereby generating an on-pulse width. The on-pulse width is determined by the current value from the current-source MOS 210 and the capacitance value of a capacitor CT1, i.e., a timing capacitor. This on-pulse width is of a control mode that operates in accordance with the current ratio determined by the control from the error amplifier EA. Namely, since this current ratio is equal to the duty, the output voltage Vout becomes equal to the voltage that is proportional to the duty α of the input voltage Vin.

(c) In the case of Vout≦(Vref−Δ), the duty is forcefully set at 100%. For this purpose, both ends of the capacitor CT1, i.e., the timing capacitor, are short-circuited by a MOS switch M21 so as to maintain the on-state, which makes the duty equal to 100%. Incidentally, a detection result by an overcurrent detecting circuit OC1 is also added to the reset RST, thereby preventing a component breakdown caused by an overcurrent from the upper-side Power MOSFET Q1. Connecting the Phase 2 power-supply on the lower-half side in FIG. 12, the explanation will be omitted because the operation is the same as the Phase 1 power-supply.

In the operations described so far, in the steady state, the inductor currents from the 2 power-sources operate in opposite phases, i.e., in phases shifted to each other by 180°. Meanwhile, at the transient time, the inductor currents from the 2 power-supplies become the same in their phases, thereby dealing with a rapid load variation. The present embodiment not only increases the output current by using the plural power-supplies, but also reduces a ripple in the output voltage.

In the case of providing the 2 or more power-supply device units, there are provided an oscillator and a phase shift circuit that the plural power-supply device units have in common. Moreover, in the steady state, phases of driving pulses of the upper-side/lower-side Power MOSFETs in the respective power-supply device units are respectively shifted to phases that result from dividing 360° by the number of the power-supply device units located in parallel. At the transient state, as are the cases with the above-described (a) and (c), all of the parallel power-supply device units are operated by driving pulses of one and the same phase. In the case of, e.g., the 4 power-supply device units, it is advisable to shift the phases of the respective phases of 0° (i.e., criterion), 90°, 180°, and 270°.

Embodiment 6

Next, the explanation will be given below concerning an embodiment of the IC chip configuration of the power-supply control device in the present invention.

Figures 13, 14:
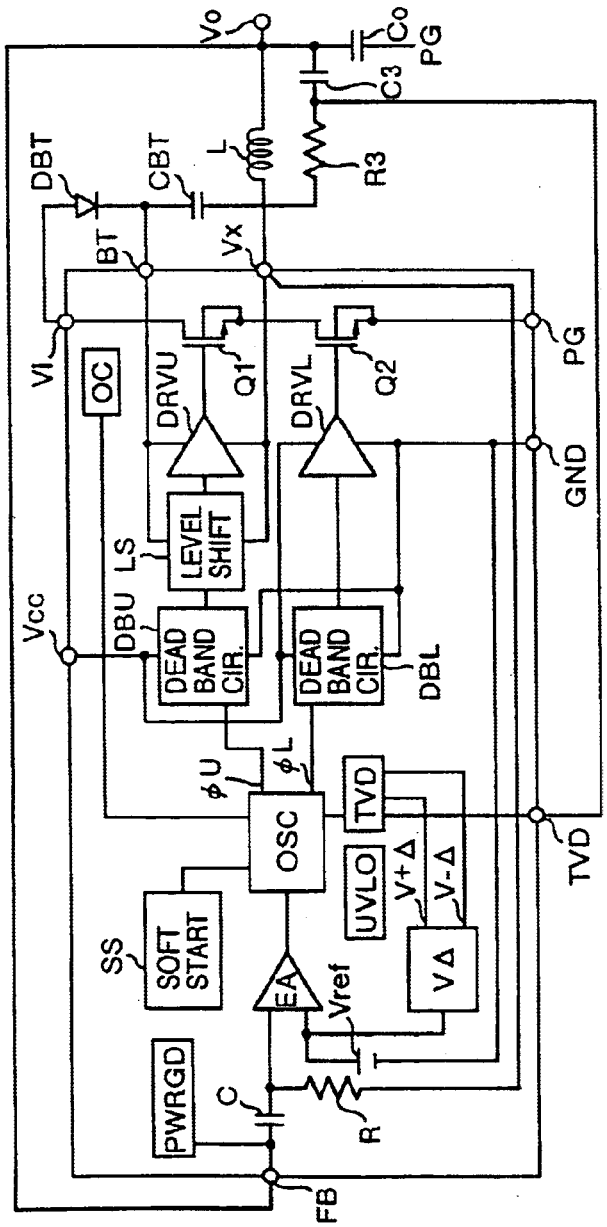
FIG. 13 is a diagram for illustrating the operation state mode in FIG. 12.
FIG. 14 is a circuit block diagram for illustrating an example of the chip configuration of a power-source device of a sixth embodiment in the present invention.

FIG. 14 illustrates the embodiment of the one-chip configuration of the circuit configuration illustrated in FIG. 8. In FIG. 14, circuits and functions are all implemented on-chip on one semiconductor board except for the following externally-mounted components: The LC smoothing filter, the CR circuit consisting of the capacitor C3 and the resistor R3 for detecting the current phase of the transient variation detecting circuit TVD, and a boost circuit consisting of a diode DBT and a capacitor CBT.

Figure 15:
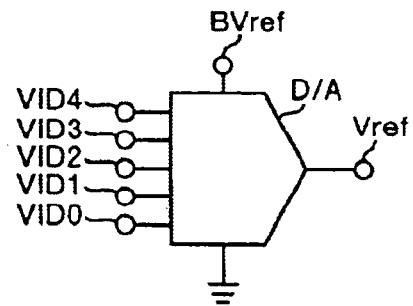
FIG. 15 is an explanatory diagram for explaining a VID code input D/A converter applied to FIG. 14.

The on-chip implemented circuits and functions are as follows: The CR smoothing filter consisting of the capacitor C and the resistor R, the error amplifier EA, the reference voltage Vref, the pulse-width modulation oscillator PWM, a dead band circuit DBU, a dead band circuit DBL, a level shift circuit LS, a driver DRVU, a driver DRVL, the upper-side/lower-side Power MOSFETs Q1, Q2, an overcurrent detecting circuit OC, the transient variation detecting circuit TVD, an upper and lower limit-voltage generating circuit VΔ, a soft-start circuit SS, an under-voltage lockout circuit UVLO, and a power-good circuit PWRGD. Incidentally, instead of acquiring the reference voltage Vref from a band-gap reference circuit, the reference voltage Vref may be acquired by receiving a digital signal corresponding to a VID (: Voltage Identification) code, using an on-chip D/A converter illustrated in FIG. 15. Although there exist not-illustrated circuits and functions, the 1-chip power-supply control IC in the present embodiment is equipped with the functions implemented in compliance with the VRM 9. 1 expounded by the Intel Corporation.

Although, in FIG. 14, the explanation has been given selecting the case where the upper-side Power MOSFET Q1 is the NMOS, the MOSFET Q1 may also be a PMOS. In this case, the externally-mounted boost circuit becomes unnecessary. However, since it is necessary to drive the gate of the PMOS at the electric potential from the input terminal Vi, a voltage-generating supply for this necessity is implemented on-chip.

The voltage fed to the input terminal Vi and the one fed to a power-supply terminal Vcc may be made equal to each other, e.g., 5V or 12V. Otherwise, the voltages may be made different, e.g., 12V is fed to the input terminal Vi, and 5V is fed to the power-supply terminal Vcc. When the voltage fed to the input terminal Vi, and the one fed to the power-supply terminal Vcc are different, 5V to the power-supply terminal Vcc may be fed from the outside. Otherwise, 5V may be generated by the on-chip circuit from 12V fed to the input terminal Vi, then being supplied thereto. Incidentally, when feeding 12V to the input terminal Vi, an about 7V Zener diode is connected to the boost circuit in FIG. 14 in series with the diode DBT, thereby preventing the gate voltage of the upper-side Power MOSFET from becoming too large.

Also, in the operation of the soft-start circuit, at the time of injecting the power-supply, it is preferable to mask the output signal from the transient variation detecting circuit for the high-speed response.

Embodiment 7

Figure 16:
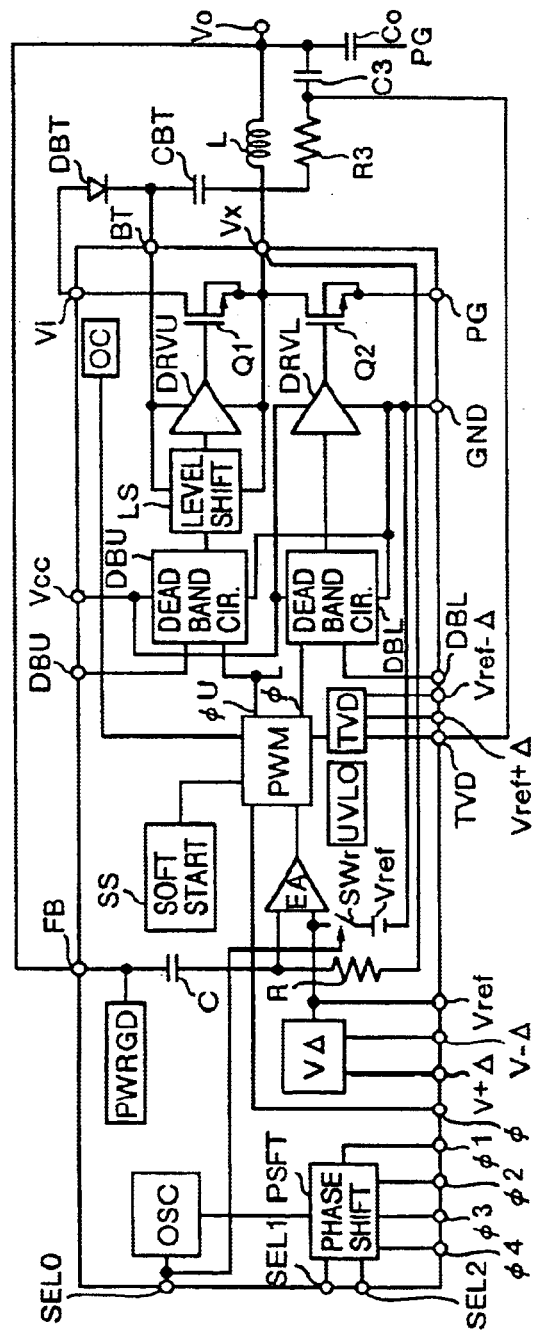
FIG. 16 is a circuit block diagram for illustrating a multi-phase compatible chip of a seventh embodiment in the present invention.

FIG. 16 illustrates a multi-phase-compatible IC chip configuration in the present embodiment. The configuration in FIG. 16 results from multi-phasing the circuit configuration of the IC chip illustrated in FIG. 14. The point that differs from the 6th embodiment in FIG. 14 is that the oscillator OSC and the phase shift circuit PSFT are added to the IC chip. As IC pins that become necessary for implementing the multi-phasing, there exist terminals for providing its-own/the other IC chips with phase pulses $\phi 1$ to $\phi 4$ that correspond to the number of the multi phases, and terminals for supplying the reference voltage Vref, and outputs from the upper and lower limit-voltage generating circuit VΔ to the transient variation detecting circuit TVD.

In the case of configuring the multi phases, at first, IC chips are prepared by the number of the desired multi phases, and, from among the IC chips, one IC chip is selected as a master. Concretely, a selection signal SEL0 for selecting the master IC chip activates the oscillator OSC and a switch SWr, and 2 bits of selection signals SEL1 and SEL2 specify the desired multi-phase number. Next, the master IC chip supplies the phase pulses $\phi 2$ to $\phi 4$, the reference voltage Vref, and the outputs Vref+Δ and Vref−Δ from the upper and lower limit-voltage generating circuit ΔV. As a result, it turns out that $\phi 2$ to $\phi 4$, Vref, Vref+Δ, and Vref−Δ are added to the other IC chips, respectively. This allows the implementation of the multi-phasing.

Although, in the present embodiment, the multi-phase number has been illustrated as 4, no limitation is imposed on the multi-phase number. The selection-signal number for setting the multi-phase number is modified, and the circuit configuration of the phase shift circuit PSFT is modified to a circuit configuration that matches the multi-phase number, and these pieces of information are installed into the IC chips. This allows the multi-phase number to be increased or decreased depending on the requirements.

Embodiment 8

Figure 17:
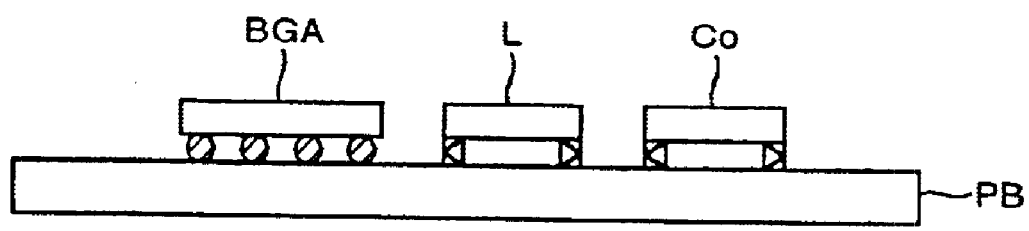
FIG. 17 is an explanatory diagram for explaining the printed wiring board implementation of a power-source control IC of an eighth embodiment.

FIG. 17 illustrates an embodiment where the power-supply control IC chip in the present invention is implemented on a printed wiring board. In FIG. 17, the power-supply control ICs, and the inductor L and the capacitor Co are mounted on a printed wiring board PB with the use of a BGA (: Ball Grid Array) and chip components, respectively, thereby allowing the downsized high-density implementation. Here, the capacitor Co is the chip ceramic capacitor.

Incidentally, although not illustrated, in addition to these components, the CR circuit of the capacitor C3 and the resistor R3, the boost circuit, and the input capacitor are mounted on the printed wiring board PB with the use of chip components in this embodiment. Also, other than the on-chip mounting by the BGA, the CSP (: Chip Size Package) mounting may also be employed.

Furthermore, in the case of the multi-phase compatibility, other than the on-chip mounting of the plural power supply control ICs, the MCM (: Multi Chip Module) mounting may also be employed. In addition to these mountings, components divided into 2 IC chips, such as a control unit including the error amplifier, the oscillator PWM, and the like, and a driver unit where the Power MOSFETs are built-in, may also be mounted on the printed wiring board in much the same way.

As described above, according to the present embodiment, it becomes possible to implement the elimination of a pin neck, an enhancement in the heat-dissipating capability, and the downsizing of the printed wiring board of the power-supply device.

Embodiment 9

Figure 18:
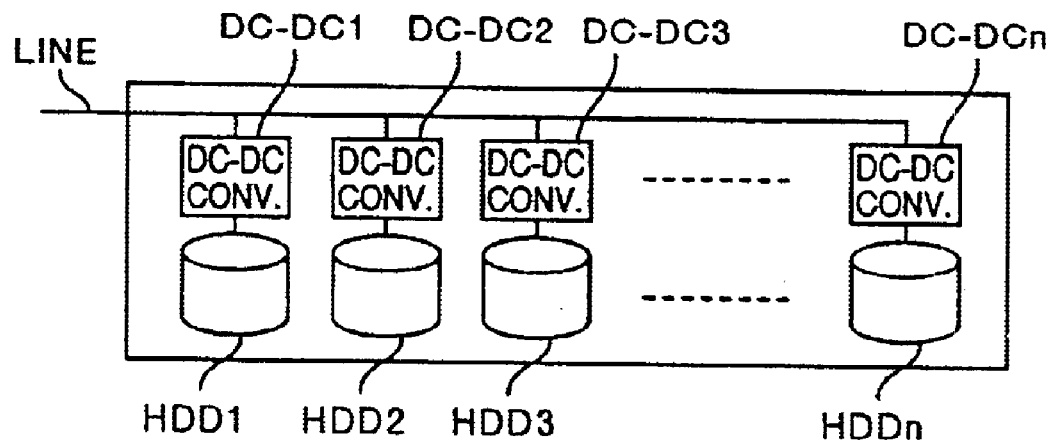
FIG. 18 is an explanatory diagram for explaining a HDD device of a ninth embodiment.

FIG. 18 illustrates the present embodiment. FIG. 18 illustrates the embodiment that results from applying the present invention to HDDs (: Hard Disk Drives). Each of the HDDs includes a magnetic storage disk, a magnetic head, a magnetic-disk rotating drive, a magnetic-head drive, a magnetic-head position controller, and an input/output signal controller. DC-DC converters DC-DC1 to DC-DCn, i.e., the power-supply devices described in the first to the eighth embodiments, supply electric power to these HDDs HDD1 to HDDn. As the DC-DC converters DC-DC1 to DC-DCn, i.e., the power-supply devices illustrated in FIG. 18, the single-phase power-supply devices or the multi-phase power-supply devices are used, depending on the current capacities of the HDDs, i.e. the targets of the power supply.

Embodiment 10

Figure 19:
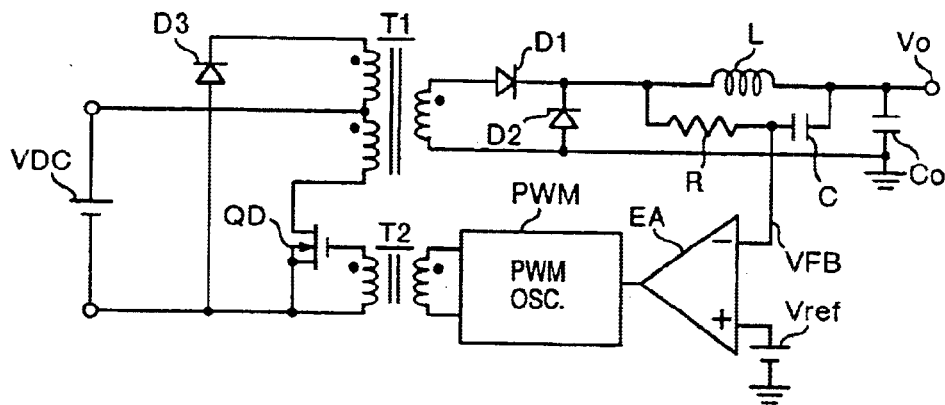
FIG. 19 is an explanatory diagram for explaining a tenth embodiment in the present invention.

Next, the explanation will be given below concerning an embodiment where the control scheme in the present invention is applied to isolation type DC-DC converters. FIG. 19 illustrates the embodiment applied to a forward type converter. In FIG. 19, as is the case with FIG. 3, the CR smoothing filter of C and R is set up at both ends of an inductor L of the forward type converter. Next, the error amplifier EA generates an amplified error voltage, using the relationship between a voltage VFB at the midpoint of the CR smoothing filter and a reference voltage Vref. Moreover, the use of the pulse-width modulation oscillator PWM converts this amplified error voltage into a PMW pulse. This PWM pulse is passed through a transformer T2, and is applied to the gate of a Power MOSFET QD for driving a transformer T1, then being subjected to the negative-feedback control. This allows a desired output voltage to be acquired in a stationary manner at the output terminal Vo. The present method performs no negative-feedback control over the output from the power LC filter, thereby making it possible to configure a high loop-stability power-supply system. Consequently, the present embodiment is especially effective when the ceramic capacitor is used as C of the LC filter.

Although, so far, the explanation has been given using the CR filter in FIG. 3, the explanation is also possible using the method in FIG. 1. Also, instead of the transformer T2, the implementation is also possible using a photo coupler. In FIG. 19, the explanation has been given selecting the 1-stone forward type converter. The above-described control scheme, however, is also applicable to the other isolation type DC-DC converters such as 2-stone forward type, push-pull type, half-bridge type, and full-bridge type.

Embodiment 11

Figure 21:
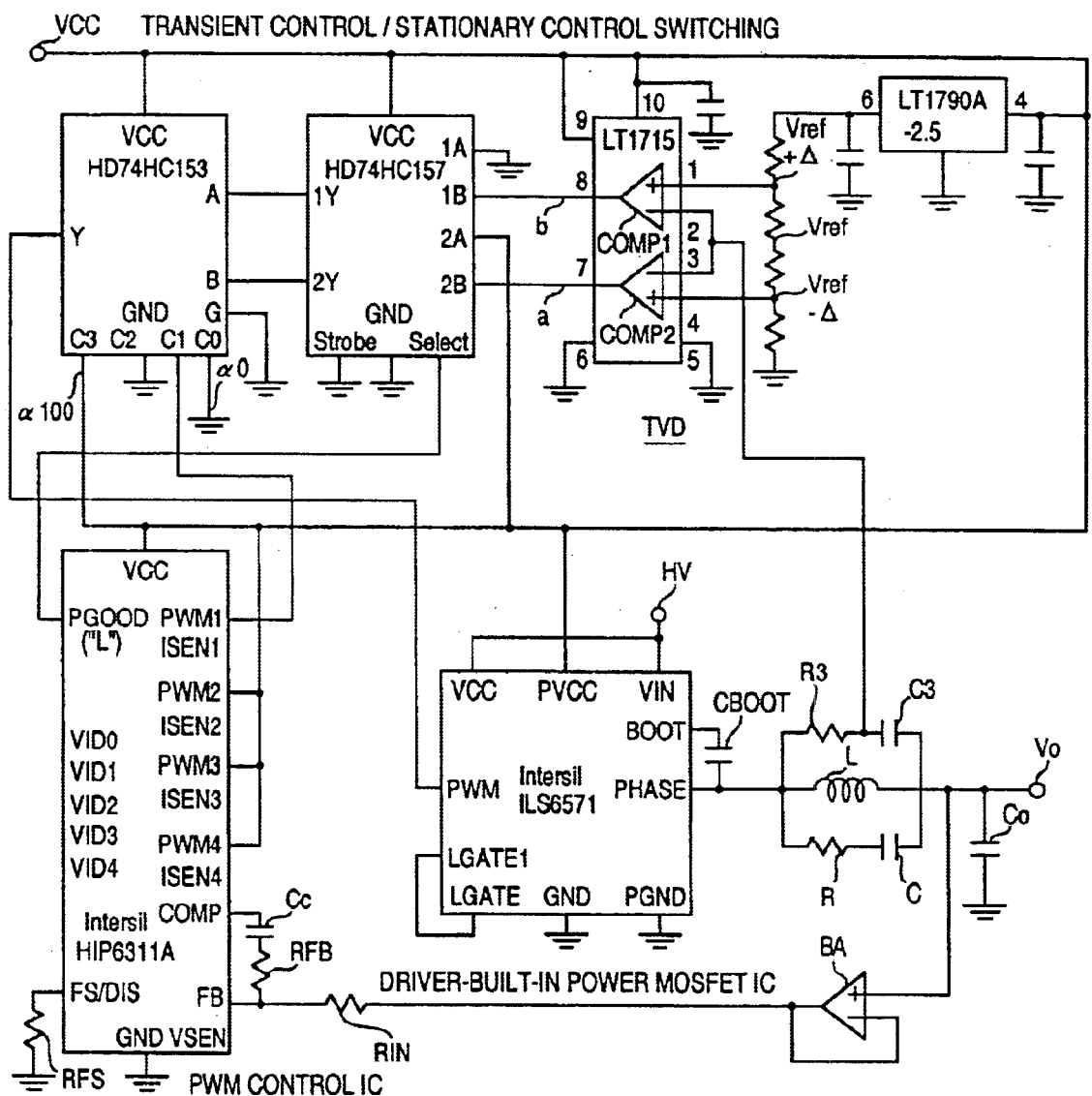
FIG. 21 is an explanatory diagram for explaining an eleventh embodiment in the present invention applied to a commercially-available power-source IC.

Next, the illustration will be given below regarding an embodiment where the control scheme in the present invention is applied to a commercially-available power-supply IC. FIG. 21 illustrates the case where a PWM control IC HIP6311A and a driver-built-in Power MOSFET IC ILS6571 of the Intersil Corporation are used as the commercially-available power-supply IC. The midpoint of C and R of one-side CR smoothing filter set up at both ends of an inductor L is connected to a feedback terminal FB of the PWM control IC HIP6311A. The midpoint of C3 and R3 of the other-side CR smoothing filter is connected to a transient variation detecting circuit TVD comprised of a reference power-source LTI790A and a converter LT1715 of the Linear Technology Corporation through a high-input-impedance buffer amplifier BA and a resistor RN. Moreover, from the relationship between logical levels "H" and "L" of two signals a and b acquired by the transient variation detecting circuit TVD, 3 operation state modes, i.e., a PWM pulse signal PWM1 (desired duty $\alpha$) outputted from the PWM control IC, a duty 0% $\alpha 0$, and a duty 100% $\alpha 100$, are switched selectively as indicated in FIG. 22 by a selector HD74HC153, HD74HC157. Furthermore, its selected signal Y is outputted to a PWM terminal of the driver-built-in Power MOSFET IC. This shows that the control scheme in the present invention is also applicable easily to the power-supply device configured using the commercially-available power-supply IC. The application of the present invention is not limited to the products described in the above-described embodiment. Incidentally, when the transient variation detecting circuit TVD is not used, the PWM pulse signal PWM1 outputted from the PWM control IC is directly connected to the PWM terminal of the driver-built-in Power MOSFET IC, thereby making it possible to implement the present invention.

It is needless to say that, although not illustrated, the power-supply devices in the first to the eighth embodiments can be applied and expanded to the other apparatuses, e.g., a VRM, a DC-DC converter for portable appliance, and a general-purpose DC-DC converter.

In the power-supply device of the present invention, none of the secondary delay by the power LC smoothing filter enters the control loop, which enhances the stability of the control loop. This further makes it possible to use the small-ESR chip ceramic capacitor in the LC smoothing filter, thereby implementing the downsizing of the power-supply device.

In the power-supply device of the present invention, the upper and lower limit value detecting circuit controls the high-speed response at the transient state. This allows the power-supply device to make response to even the high current slew rate (i.e., di/dt).

The power-supply device of the present invention can be easily multi-phased. This makes it possible to simultaneously implement both the large output current and the ripple-voltage reduction.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A power-supply device including a step-down DC-DC converter, comprising:

power semiconductor switching components, driving means for driving said power semiconductor switching components, a pulse-width modulation oscillator to supply said driving means with a driving signal, an error amplifier to supply said pulse-width modulation oscillator with an error signal indicating a comparison result between a reference value and an output power, wherein a control loop of said power-supply device includes a filter provided independently of a power output filter through which said output power passes, an output signal corresponding to said output power being fed back to said error amplifier after having passed through said independently provided filter, and wherein said power output filter is an LC filter comprised of an inductor and a capacitor, said independently provided filter being a CR filter comprised of a capacitor and a resistor, said CR filter being connected to both ends of said inductor of said power output filter, and said output signal being fed back to said error amplifier after having passed through said CR filler, and a transient variation detecting circuit, said transient variation detecting circuit, detecting said output power from an output terminal of said power output filter, and, if said output power has been found to exceed a predetermined upper-limit value, outputting a signal for setting the duty α of said pulse-width modulation oscillator at 0%, and, if said output power has been found to be lower than a predetermined lower-limit value, outputting a signal for setting said duty α of said pulse-width modulation oscillator at 100%.

2. The power-supply device according to claim 1, wherein said power semiconductor switching components, said driving means for driving said power semiconductor switching components, said pulse-width modulation oscillator, said error amplifier, and said transient variation detecting circuit are formed on one and the same semiconductor board.

3. A power-supply device implemented by applying said power-supply device according to claim 1 to an isolation type DC-DC converter.

4. A power-supply device implemented by using a combination of an oscillator, a one-shot multivibrator, and a voltage-to-current converter as said pulse-width modulation oscillator of said power-supply device according to claim 1.

5. A multi-phase control power-supply device, comprising:

a phase shift circuit, and said pulse-width modulation oscillator of said power-supply device according to claim 4, wherein said phase shift circuit is provided after said oscillator, said one-shot multivibrator being provided in correspondence with each phase.

6. A power-supply device according to claim 1, wherein said error amplifier has a low input impedance, and is connected to the output of said independently provided filter through a buffer amplifier having a high input impedance.

7. An integrated circuit wherein a power-supply device according to claim 1 is built in a semiconductor chip.

8. The power-supply device according to claim 1, wherein a relation of fLC<fCR is established where the frequency of said CR filter is fCR and the frequency f said filter LC is fLC.

9. A power-supply device including a step-down DC-DC converter, comprising:

power semiconductor switching components, driving means for driving said power semiconductor switching components, a pulse-width modulation oscillator to supply said driving means with a driving signal, an error amplifier to supply said pulse-width modulation oscillator with an error signal indicating a comparison result between a reference value and an output power, wherein a control loop of said power-supply device includes a filter provided independently of a power output filter through which said output power passes, an output signal corresponding to said output power being fed back to said error amplifier after having passed through said independently provided filter, and wherein said power output filter is an LC filter comprised of an inductor and a capacitor, said independently provided filter being a CR filter comprised of a capacitor and a resistor, said CR filter being connected to both ends of said inductor of said power output filter, and said output signal being fed back to said error amplifier after having passed through said CR filler, and a transient variation detecting circuit, said transient variation detecting circuit, detecting said output power from an output terminal of said CR filter newly provided at both ends of said inductor of said power output filter, and, if said output power has been found to exceed a predetermined upper-limit value, outputting a signal for setting the duty α of said pulse-width modulation oscillator at 0%, and, if said output power has been found to be lower than a predetermined lower-limit value, outputting a signal for setting said duty α of said pulse-width modulation oscillator at 100%.

10. The power-supply device according to claim 9, wherein said power semiconductor switching components, said driving means for driving said power semiconductor switching components, said pulse-width modulation oscillator, said error amplifier, and said transient variation detecting circuit are formed on one and the same semiconductor board.

11. A power-supply device implemented by applying said power-supply device according to claim 9 to an isolation type DC-DC converter.

12. A power-supply device implemented by using a combination of an oscillator, a one-shot multivibrator, and a voltage-to-current converter as said pulse-width modulation oscillator of said power-supply device according to claim 9.

13. A multi-phase control power-supply device, comprising:

a phase shift circuit, and said pulse-width modulation oscillator of said power-supply device according to claim 12, wherein said phase shift circuit is provided after said oscillator, said one-shot multivibrator being provided in correspondence with each phase.

14. A power-supply device according to claim 9, wherein said error amplifier has a low input impedance, and is connected to the output of said independently provided filter through a buffer amplifier having a high input impedance.

15. An integrated circuit wherein a power-supply device according to claim 9 is built in a semiconductor chip.

16. The power-supply device according to claim 9, wherein a relation of fLC<fCR is established where the frequency of said CR filter is fCR and the frequency f said filter LC is fLC.

* * * * *